Feb. 10, 1970 J. H. ROSE ET AL 3,494,438

ADJUSTABLE SNOWMOBILE SUSPENSION

Filed July 15, 1968 3 Sheets-Sheet 1

INVENTORS.
JACK H. ROSE
BY ROBERT P. MATHERLY
Tweedale & Gerhardt
ATTORNEYS.

ADJUSTABLE SNOWMOBILE SUSPENSION

INVENTORS.
JACK H. ROSE
BY ROBERT P. MATHERLY
Tweedale & Gerhardt
ATTORNEYS.

ADJUSTABLE SNOWMOBILE SUSPENSION

Filed July 15, 1968 3 Sheets-Sheet 3

INVENTORS.
JACK H. ROSE
BY ROBERT P. MATHERLY
Tweedale & Gerhardt
ATTORNEYS.

United States Patent Office 3,494,438
Patented Feb. 10, 1970

3,494,438

ADJUSTABLE SNOWMOBILE SUSPENSION

Jack H. Rose and Robert P. Matherly, Livonia, Mich., assignors to Massey-Ferguson Inc., Des Moines, Iowa, a corporation of Maryland Filed July 15, 1968, Ser. No. 747,771
Int. Cl. B62m *27/00, 29/00;* B62d *55/14*
U.S. Cl. 180—5 2 Claims

ABSTRACT OF THE DISCLOSURE

A snowmobile has a body which mounts a pair of steerable skis and an endless driven track for propulsion. The rear portion of the body is supported on the track by a plurality of bogey wheels and by rear idler sprocket wheels. The rear idler sprocket wheels are rotatably supported on forwardly extending lever arms that are pivoted to the body and biased toward the ground by stiff torsion springs. Movement of the lever arms toward the ground is limited by engagement with an adjustable stop to vary the position of the rear idler sprocket wheels relative to the body. The skis are connected to the steering mechanism by leaf spring units which are adjustable mounted on the skis to variably position the skis relative to the body. These adjustments vary the snowmobile weight distribution between the bogey wheels, and the rear idler sprocket wheels and skis to vary traction and steering.

This invention relates generally to endless tracked vehicles and more particularly to a suspension for a small personal endless track vehicle known generically as a snowmobile.

Snowmobiles are conventionally propelled over all types of terrain or ground, such as ice, snow or frozen turf, by an endless track the snowmobile is supported on the track by a plurality of bogey wheels or runners, and a plurality of rear idler sprocket wheels which are longitudinally adjustable to vary track tension. These sprocket wheels are supported on the ends of lever arms pivoted to the body and biased downwardly by stiff springs. The steerable skis are conventionally mounted to the steering mechanism by leaf spring units which thereby space the skis from the body.

In the conventional arrangement outward movement of the rear idler sprocket wheels is limited by engagement of the lever arms with a fixed stop. This arrangement, plus the spacing of the skis relative to the body determines the snowmobile weight distribution between the track and the skis. This gives the snowmobile fixed steering and traction characteristics.

It is an object of this invention to provide an adjustable suspension for a snowmobile to enable selective variance of the weight distribution between the skis and the track to enable selection of various steering and traction characteristics for the snowmobile. It is another object to provide adjustable spacing of the rear idler sprocket wheels relative to the body to vary the weight distribution. It is a further object to provide means for adjusting the spacing of the skis relative to the body to vary the weight distribution.

This invention provides a snowmobile suspension having two points of adjustment to accomplish the foregoing objects. An adjustable stop is mounted on the body for limiting movement of the rear idler sprocket wheels away from the body under the influence of the suspension springs. The leaf spring units which mount the skis to the steering mechanism are adjustable to vary the arch of the spring and thereby vary the spacing of the skis relative to the front of the snowmobile body.

Other objects and features of this invention will become more readily apparent upon reference to the following detailed description of a preferred embodiment of this invention shown in the accompanying drawings, in which.

Figure 1:
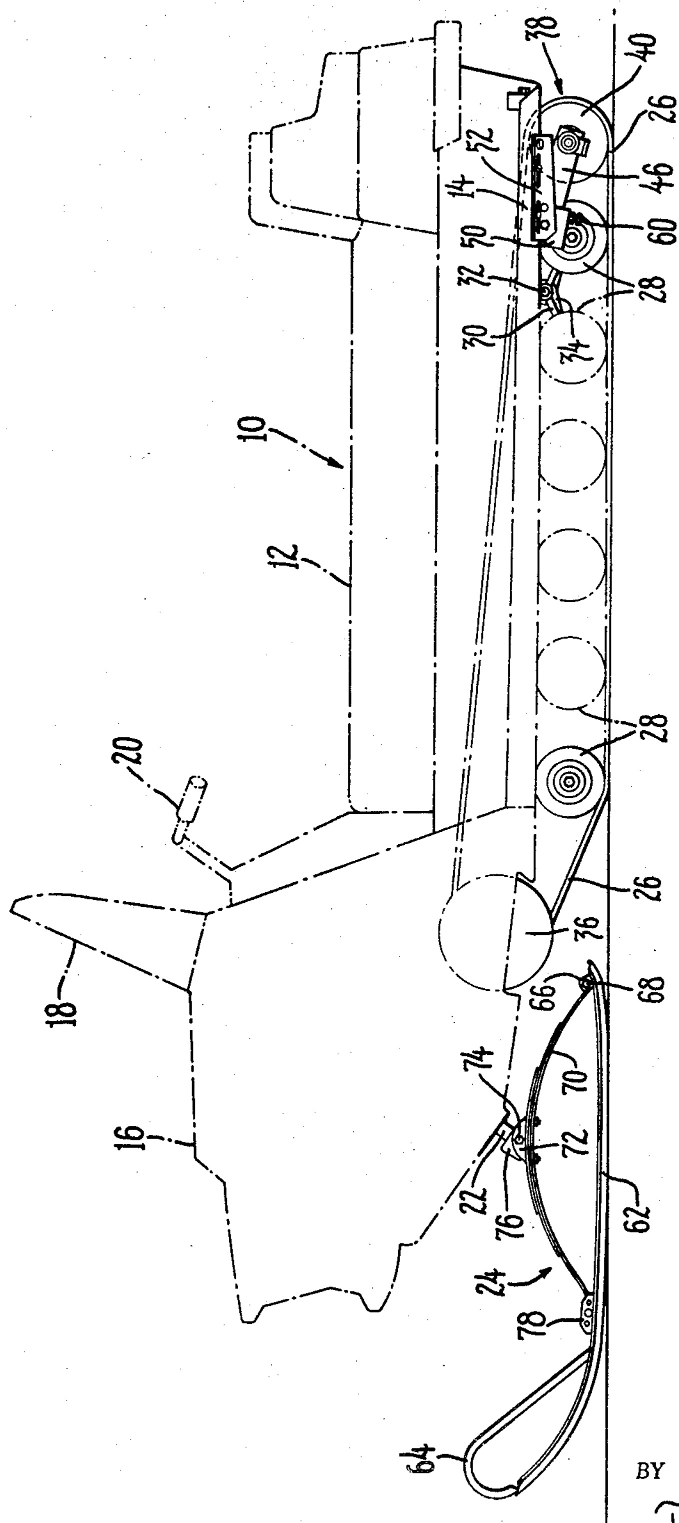
FIG. 1 is a side elevation of a snowmobile, partly in phantom lines, embodying an adjustable suspension according to this invention.

Referring now to FIG. 1 of the drawings, a snowmobile includes a body 10 that is provided with a passenger seat 12, a footrest 14, and a front cowl 16 which supports a windshield 18. The body 10 also monuts a steering operator or handlebars 20 which operate a conventional steering linkage (not shown) to pivot a pair of spaced steering shafts 22. An adjustable ski assembly 24, according to this invention, is mounted on each shaft 22. Since the two ski assemblies 24 are identical, only one of them is shown and will be later described.

The snowmobile body 10 is propelled along the ground by an endless flexible track 26, the lower run of which supports a plurality of bogey wheels 28. Pairs of the bogey wheels 28 (only the left side wheels of each pair are shown) are mounted on lever arms 30 that are pivoted to body mounted shafts 32. The bogey wheels are biased away from the body by torsion springs 34 which surround shafts 32 and engage the lever arms 30. The bogey wheels thus support the weight of the rear portion of body 10 on the track 26.

The track 26 is conventionally driven by a sprocket wheel (not shown) located behind a body mounted shield 36. The driving sprocket wheel is driven by a power source (not shown) mounted within the front cowl 16.

Figure 2:
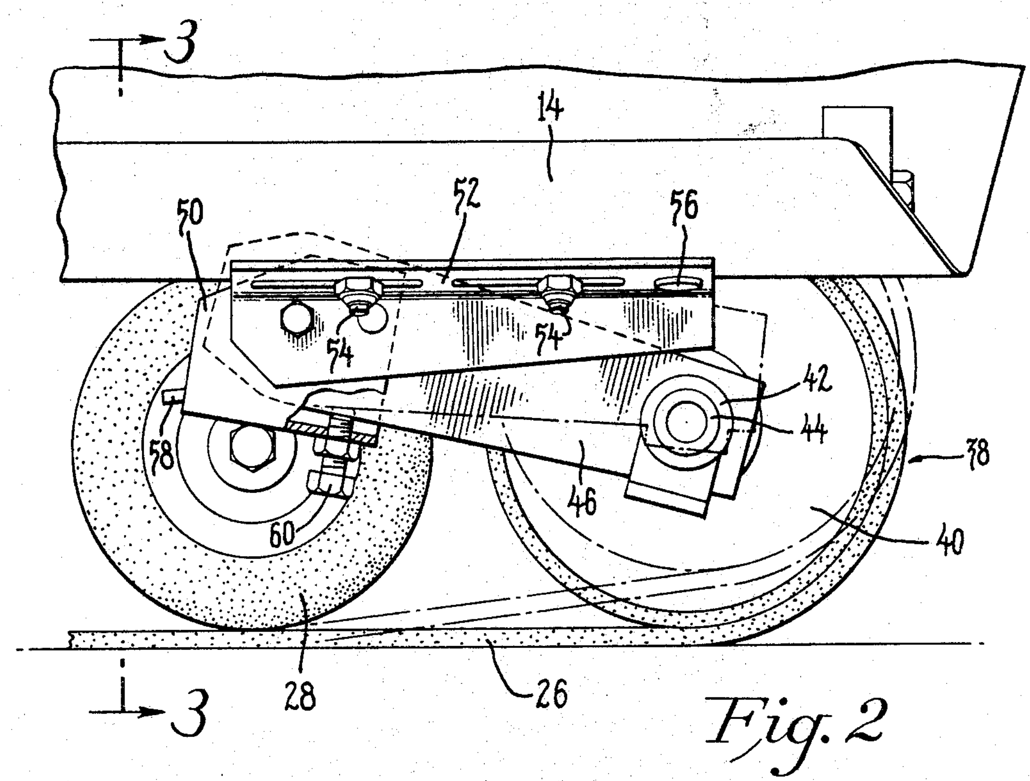
FIG. 2 is an enlarged partially broken away detail view of an adjustable rear suspension, according to this invention.
Figure 3:
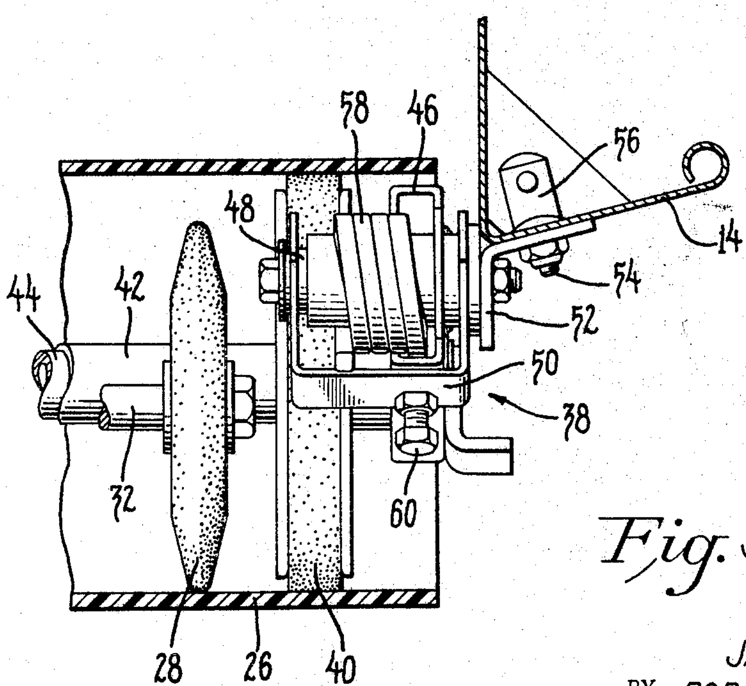
FIG. 3 is a sectional view taken generally along lines 3—3 of FIG. 2.
Figure 4:
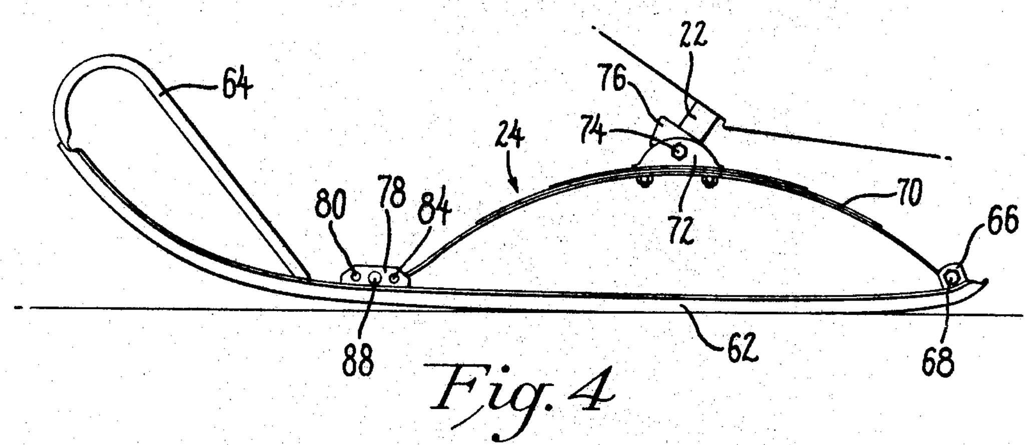
FIG. 4 is an enlarged detail view of an adjustable ski suspension, according to this invention.

Track tension is maintained by a rear idler sprocket wheel assembly 38, shown in better detail in FIGS. 2 and 3. The assembly 38 is fully disclosed in a copending application entitled, "Snowmobile Suspension," filed on even date herewith, and will be described here only sufficiently to disclose the invention. Since both sides of the assembly 38 are identical, only the left side is shown and will be described.

Each side of the assembly 38 includes a rear end or idler sprocket wheel 40 which is mounted on a sleeve 42 rotatably supported on a shaft 44. At its extremity, shaft 44 mounts a lever arm 46. Lever arm 46 extends forwardly of the body 10 and is pivoted to a shaft 48 which mounts a bracket 50. The shaft 48 is mounted on a flanged bracket 52 that is longitudinally adjustably secured to the footrest 14 by bolts 54 and screw posts 56, as fully described in the aforementioned copending application.

A stiff torsion spring 58 surrounds shaft 48 and has one arm engaging bracket 50 and the other end engaging the lower end of lever arm 46. This biases the lever arm 46 and the rear idler sprocket wheel 40 away from the body. Movement of lever arm 46 away from the body 10 under the influence of spring 58 is limited by engagement of the lower edge of the lever arm 46 with an adjustable bolt or stop 60 which is secured to bracket 50, as best seen in FIG. 2.

Referring now to FIGS. 4 thru 7, the construction of the ski assembly 24 will now be described. The assembly 24 includes a curved ground engaging ski 62 which terminates at its upturned forward end in a curved handle 64. A bracket 66 is mounted on the rear edge of ski 62 and receives bolt 68 which secures the eye (not shown) of a leaf spring unit 70. Intermediate its ends spring unit 70 mounts a bracket 72 that is pivoted at 74 to a bracket 76 mounted on the end of steering shaft 22.

Figure 6:
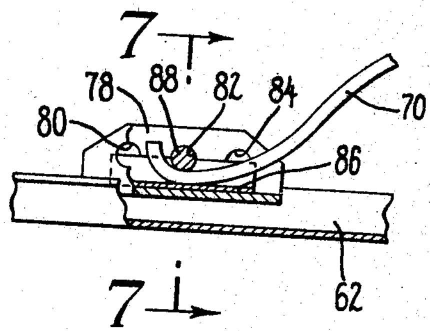
FIG. 6 is an enlarged detail view of the ski adjustment, partially broken away to show the details of construction.
Figure 7:
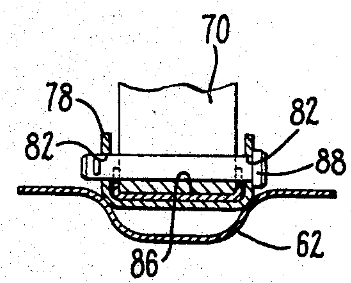
FIG. 7 is a sectional view taken generally along lines 7—7 of FIG. 6.

Adjacent the handle 64, the ski 62 mounts a bracket 78 having three pairs of spaced aligned holes 80, 82 and 84. As best seen in FIGS. 6 and 7, a pin 88 is fitted through pairs of aligned apertures to slidingly confine the front end of spring unit 70 between it and the base 86 of the bracket.

Figure 5:
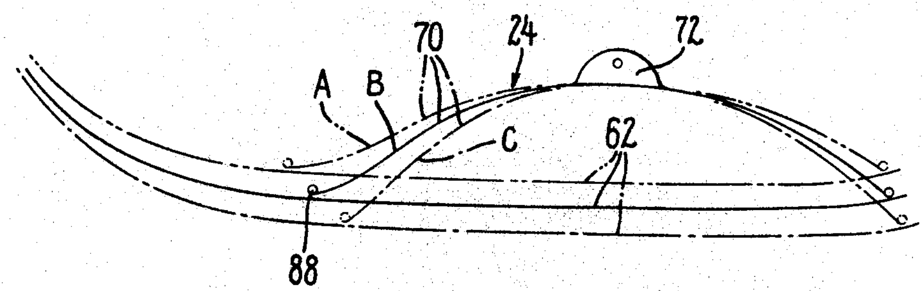
FIG. 5 is a schematic representation of the adjustable ski suspension, showing different ski positions.

Referring now to FIG. 5, mounting of pin 88 in the different holes 80, 82 and 84 results in the various arch configurations of spring unit 70 and different spacings of the ski 62 from the brackets 72, and thus from the body 10, as illustrated.

Two factors are extremely important in the operation of any snowmobile. One is the traction for propelling the snowmobile, and the other is the effectiveness of the steering. For a given engine size and body weight, the traction characteristics depend upon the amount of body weight supported on the lower track run. This is because body weight is transmitted through the bogey wheels and their springs and distributed over the lower track run, effecting a ground pressure which provides traction when the track is driven. Thus, the more weight supported on the lower track run, the more ground pressure and traction available. Conversely, the less weight supported, the less ground pressure and traction available.

Silimarly, the steering of the snowmobile is dependent upon the amount of weight which is placed on the skis to press them into the snow. Thus, very "heavy," but very effective steering, is achieved by putting a greater amount of weight on the skis, whereas "lighter," but less effective steering, is gained by taking weight off the skis. Since both the skis and the track support the total body weight of the snowmobile, distribution of the weight between the skis and the track will determine both the traction and the steering characteristics of the snowmobile. In racing and hill climbing, it is desirable to have a greater amount of traction at the sacrifice of steering. Conversely, operation over a winding path where maneuverability is desirable requires a greater amount fo steering, even at the sacrifice of traction.

Conventionally, snowmobiles are designed with a fixed weight distribution between the skis and the track. However, because ground conditions vary, this weight distribution cannot be entirely effective throughout the entire range of snowmobile operating conditions, since it is necessarily a compromise. The snowmobile according to this invention, has two means of adjusting the weight distribution of the snowmobile so that an operator may select the traction and steering characteristics he desires for all operating conditions.

This variation of weight distribution is accomplished through the adjustment of the stop bolts 60 for lever arms 46 and by the location of pins 88 for spring units 70. Referring again to FIG. 5, it is readily seen that changing the location of pins 88, the skis 62 move toward or away from the front of body 10. As the skis 62 move away from the body 10 (i.e. from position B to C), the body is pivoted about its rear end and lifted off the ground. This takes weight off of the front bogey wheels 28 through less tensioning of springs 34 and decreases the ground pressure exerted by the lower run of track 26. The "lost" weight is transferred to the skis 62 and rear idler sprocket wheels 40. This decrease in track ground pressure results in less traction, while the added weight to the skis gives heavier steering. Conversely, movement of skis 62 to position A lowers the body by lifting the skis. This adds weight to the bogey wheels 28 and increases track pressure and consequently takes weight off the skis and rear idler sprocket wheels 40, which results in more traction and lighter steering.

Referring again to FIG. 2, the stiff torsion spring 58 normally positions the lever arm 46 against stop bolt 60. As bolt 60 is adjusted upwardly of the bracket 50, the lever arms 46 lift the rear idler sprocket wheels 40 off the ground, as shown exaggerated in phantom lines. This pivots the body downwardly about the front end and transfers weight from the rear idler sprocket wheels 40 and skis 62 to the bogey wheels 28 through springs 34. This shift in weight distribution increases track ground pressure for increased traction and decreased steering. Conversely, extreme downward adjustment of bolt 60 moves the rear idler sprocket wheels 40 down, transferring weight from the bogey wheels 28 to the rear idler sprocket wheels 40 and skis 62, which results in less traction and heavier steering.

Thus it is seen from the above description that the adjustable snowmobile suspension according to this invention permits selective variation of weight distribution between the track and the skis to effectively vary the steering characteristics and traction of the snowmobile. By merely adjusting either or both of pair of bolts and pins, the snowmobile operator may easily alter the suspension to adapt his snowmobile to the prevalent conditions.

Another feature of the adjustable suspension of this invention is that the adjustment of spring units 70 also effects a change in their spring rate. In position A, the spring rate is softer than in positions B and C. Thus a soft spring rate may be chosen for travel along rough ground, while a harsher spring rate may be used while traversing level ground.

While only a preferred embodiment of the subject invention has been shown and described, modifications thereof are contemplated.

What is claimed is:

1. A snowmobile comprising: a body, an endless track for propelling the body along the terrain and arranged for movement along upper and lower runs, a plurality of bogey wheels mounted on the body and supporting the weight of the rear portion of the body on the lower track run to create a ground pressure, means for driving the track, a plurality of rear sprocket wheels engaging and tensioning the track, a pair of lever arms each having one end rotatably supporting the rear sprocket wheels and the other end pivoted to the body, spring means mounted on the body and biasing the lever arms and sprocket wheels away from the body and toward the terrain to vary the position of the body relative thereto, adjustable stop means mounted on the body for limiting movement of the lever arms and sprocket wheels away from the body by the spring means, a pair skis located forwardly of the track, an arched leaf spring unit for each ski and having spaced ends mounted on the ski, steering means mounted on the front portion of the body, means securing the spring units intermediate their ends to the steering means to space the skis from the body, adjustment means for varying the spacing of the spring unit ends on the skis and thus varying the arch of the spring units to variably position the skis relative to the body front portion, and steering control means on the body for operating the steering means to steer the skis, whereby selective adjustment of either of the adjustable stop means and the adjustment means varies the position of the body relative to the terrain to vary the amount of body weight supported by the track lower run and by the skis and thereby selectively vary the traction and steering characteristics of the snowmobile.

2. A snowmobile having a body; an endless track for propelling the body along the terrain; means mounting the track on the body for movement along upper and lower runs; means for driving the track; means for supporting the rear portion of the body on the lower track run to engage said run with the terrain and including a rear tensioning wheel, a lever arm pivotally connecting the wheel to the body for movement toward and away from the body, biasing means mounted on the body and biasing the lever arm and wheel away from the body, and adjustable stop means for limiting movement of the lever arm and wheel away from the body to variably position the body relative to the terrain; steerable means including a ski, an arched leaf spring unit having spaced ends mounted on the ski, control means for steering the ski, means operatively connecting the spring unit intermediate the ends thereof to the control means, adjustment means including means for selectively varying the spacing of the leaf spring unit ends on the ski to vary the arch of the spring unit, adjustment of either the adjustment means or the adjustable stop means varying the position of the body relative to the terrain to vary the amount of body weight supported by the lower track run and by the steerable means and thus vary the traction and steering characteristics of the snowmobile.

References Cited

UNITED STATES PATENTS

| | | | |
|---|---|---|---|
| 2,041,599 | 5/1936 | Fergusson | 305—27 X |
| 2,339,886 | 1/1944 | Shannon | 180—5 |
| 2,346,351 | 4/1944 | Bombardier | 180—5 X |
| 2,627,442 | 2/1953 | Junker | 180—5 X |
| 2,749,189 | 6/1956 | France | 180—5 X |
| 3,386,778 | 6/1968 | Rymes | 305—27 |

OTHER REFERENCES

Popular Mechanics—October 1967—pages 138–139, 180–5.

RICHARD J. JOHNSON, Primary Examiner

U.S. Cl. X.R.

280—21; 305—30